(12) United States Patent
Larsen

(10) Patent No.: US 6,854,589 B2
(45) Date of Patent: Feb. 15, 2005

(54) INTER-DISTANCE ADJUSTING CONVEYOR, CONVEYING METHOD, AND IRRADIATION DEVICE

(75) Inventor: Sjur Arild Larsen, Uddevalla (SE)

(73) Assignee: Scanditronix Medical AB, Uppsala (SE)

(*) Notice: Subject to any disclaimer, the term of this patent is extended or adjusted under 35 U.S.C. 154(b) by 0 days.

(21) Appl. No.: 10/380,203

(22) PCT Filed: Sep. 17, 2001

(86) PCT No.: PCT/SE01/01981
§ 371 (c)(1),
(2), (4) Date: Mar. 13, 2003

(87) PCT Pub. No.: WO02/22475
PCT Pub. Date: Mar. 21, 2002

(65) Prior Publication Data
US 2004/0099508 A1 May 27, 2004

(30) Foreign Application Priority Data
Sep. 18, 2000 (SE) .......................... 0003321-7

(51) Int. Cl.⁷ ............................................. B65G 17/32
(52) U.S. Cl. ..................................................... 198/680
(58) Field of Search ............................... 198/680, 459.8

(56) References Cited
U.S. PATENT DOCUMENTS

| | | | | |
|---|---|---|---|---|
| 1,768,493 A | * | 6/1930 | Roddy ...................... 198/477.1 |
| 3,180,279 A | * | 4/1965 | Thibault ....................... 104/89 |
| 3,402,675 A | * | 9/1968 | Witt ............................ 198/351 |
| 3,510,909 A | * | 5/1970 | Herzog ........................ 452/183 |
| 3,518,717 A | * | 7/1970 | Hamann et al. ............ 452/179 |
| 3,622,000 A | * | 11/1971 | McClenny ................... 209/594 |
| 3,643,790 A | * | 2/1972 | Altenpohl et al. .......... 198/680 |
| 3,850,285 A | * | 11/1974 | Johnson ...................... 198/680 |
| 4,278,165 A | | 7/1981 | Nielsen et al. |

FOREIGN PATENT DOCUMENTS

DK 155207 B 2/1987
EP 0 960 838 A1 12/1999

* cited by examiner

Primary Examiner—Richard Ridley
(74) Attorney, Agent, or Firm—Young & Thompson

(57) ABSTRACT

A conveyor arrangement comprises conveying elements defining a closed loop path having portions with substantially differing slopes. Driving elements are arranged to drive the conveying elements around the closed loop path. A plurality of arm elements are pivotably connected to the conveying elements. Carrier elements are pivotably connectable to the arm elements. Guiding elements are arranged in the vicinity of the closed loop path. A follower member arrangement of the arm elements comprises a first engaging element (18-A) and a second engaging element. The first engaging element is forced in contact with a first section of the guiding element during a first part of the travel along the closed loop path. Similarly, the second engaging element is forced in contact with a second section of the guiding elements during a second part of the travel along the closed loop path.

27 Claims, 6 Drawing Sheets

INTER-DISTANCE ADJUSTING CONVEYOR, CONVEYING METHOD, AND IRRADIATION DEVICE

TECHNICAL FIELD

The present invention relates generally to conveyor systems and in particular to closed loop conveyor systems providing adjustable inter-distances between the transported items.

BACKGROUND

In many industrial processes, items have to be transported from one place to another, or through a processing area, where the items are treated in different ways. A common example is an assembly line, where items are passing from one station to the other and where e.g. new parts are mounted at each station. Other examples are treatment of items, such as painting, annealing or irradiation, where the items pass through a processing area in which the treatment is performed. In all such cases, different kinds of conveyor systems are necessary.

A common type of conveyor system comprises a conveying means, e.g. a linked chain or a wire, which is formed as a closed loop. The conveying means is typically driven by a motor using a wheel or gear wheel. Supporting members are attached pivotably at the conveying means, typically at regular distances. The supporting members are connectable to carriers, in which the items are transported, or to the items themselves. The position of the supporting member is typically defined by the gravitational forces, in which cases the carriers typically always are directed downwards or by guiding means. When transporting items along a path including alternating horizontal and vertical sections, the dimensions of the transported items will play an important role. When making a 90-degree turn, from horizontal to vertical, one item may collide with the following, if not enough space is provided between them. One may from simple model reasoning understand that the space between the items has to be at least equal to the item height, in order to avoid collision. Conveyor arrangements of this type thus typically transport items separated with a certain distance.

In many applications, the interspace between the items is disadvantageous. If the items are going through a treatment, the efficiency of the treatment is reduced by the space between the items. Also, e.g. at loading or unloading, it is normally advantageous if there is no space between the items.

In the patent application GB 2 067 968, a conveyor arrangement is disclosed, which shows a planar closed-loop conveyor. A positioning arrangement is pivotably attached to a linked chain, and a carrier means is rotatably attached to the positioning arrangement. A follower member provided with a rotatable roller is attached at an arm at the positioning arrangement. The pivotable attachment point follows the chain path, while the follower member follows a guide means. The relative distance between the guide and the chain path decides the angle of the positioning arrangement and thus the relative position of the carrier means. A second positioning arrangement is rigidly attached to the carrier means. Two follower members are arranged at this second positioning arrangement, following two further guides. The relative distance between the two further guides determines the angle of the second positioning arrangement. By suitable choice of guiding structures, the carrier means can be positioned in almost any arbitrary direction. This positioning may indeed be very flexible, but the use of a multitude of guides and follower members are far too complex in most cases and occupies too much space for many treatment applications.

In the patent application DE 195 10 649, a conveyor device is disclosed, which provides for an adaptive distance between the transported items. A conveying linked chain supports carrier means along a path. At a chain joint between the attachment points of the carrier means, an arm member is attached. The arm member is provided with a follower member, which is guided along a rail arrangement, forcing the chain to bend. The bent chain makes the carrier means to be positioned closer to each other, i.e. gives rise to the adjustable distances. This conveyor has the disadvantage that the conveying means, i.e. the chain, is bent at the same time as it is supposed to drive the carrier means forwards. The forces and friction involved in such arrangements are generally high, and the total arrangement is space requiring.

In many applications, the available space around the conveyor path is limited. A general disadvantage with conveyor arrangements for adjustable item distances is that they demand quite complex and space requiring guiding means. Furthermore, angle-determining arm structures according to prior art have limited angle strokes, within which they are stable and well determined.

SUMMARY

A general object of the present invention is to provide an improved conveyor arrangement for limited conveyor spaces. A further object is to provide a conveyor arrangement having a simple and reliable design. It is also an object of the present invention to provide a conveyor arrangement, which is capable of changing the distance between the transported items during certain parts of the conveyor path. Another object of the present invention is to provide a conveyor arrangement having mechanically well defined paths.

The above objects are achieved by conveyor arrangements and conveying methods according to the enclosed claims. In general words, a conveyor arrangement comprises conveying means defining a closed loop path. The path has portions with substantially differing slopes. Driving means are arranged to drive the conveying means around the closed loop path. A plurality of arm means are pivotably connected to the conveying means around a substantially horizontal axis and follows the conveying means along the closed loop path. Carrier means are pivotably connectable to the arm means.

Guiding means are arranged in the vicinity of the closed loop path. A follower member arrangement of the arm means comprises a first engaging means and a second engaging means. The first engaging means is forced in contact with a first section of the guiding means during a first part of the travel along the closed loop path. Similarly, the second engaging means is forced in contact with a second section of the guiding means during a second part of the travel along the closed loop path.

In preferred embodiments of the present invention, the first and second parts of the travel have no common parts. At the most one of the engaging means is therefore forced in contact with the guiding means at a time. The first and second engaging means are preferably provided at opposite sides of a connection line between the attachment axis of the arm means and the centre of the connection of the carrier means. The engaging means are preferably protrusions provided with rollers. The size and distance from the conveying means may be different for the two engaging means.

In a preferred embodiment the arm means comprises at least two carrier supporting members, and the carrier means have corresponding catching means for releasable engagement with each one of the carrier supporting members. When the engaging means are active, only one carrier supporting member is in engagement with the catching means.

With the arrangement according to the present invention the position and speed of the carrier means can be adjusted within certain ranges. The front engaging means, as defined by the arm travel direction, is guidable in front of the connection point between the arm member and the conveying means. Similarly, the rear engaging means is guidable in front of the connection point. This influences the position and hence the inter-distance between consecutive carrier means. By guiding any of the engaging means forwards in relation to the connection point, the carrier means is given a speed, which exceeds the speed of the conveying means. By guiding any of the engaging means backwards in relation to the connection point, the carrier means is instead given a speed which is less than the speed of the conveying means.

According to another aspect of the invention, an irradiation equipment is presented, which uses the advantages of a conveying system according to the above description.

The advantage with the present invention is that a simple arm means arrangement allows for a mechanically safe tilting within a large angle range. This reduces the need for long arm lengths, whereby such arrangements can be used also in small spaces. By proper selection of the guiding structure form and the path of the closed loop, almost any motion of the carrier means may be obtainable.

BRIEF DESCRIPTION OF THE DRAWINGS

The invention, together with further objects and advantages thereof, may best be understood by making reference to the following description taken together with the accompanying drawings, in which:

FIG. 7b illustrates the engagement of arm members according to FIG. 6 and a carrier box according to FIG. 7a;

DETAILED DESCRIPTION

Figure 1A:
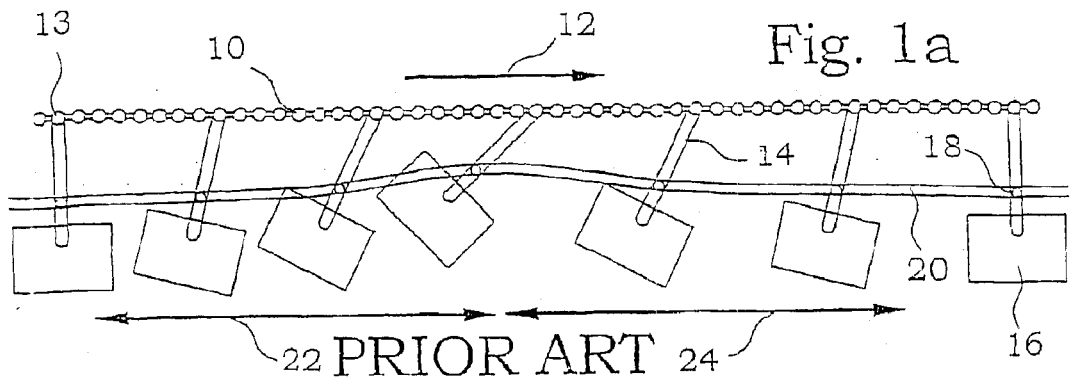
FIGS. 1a and 1b are simple sketches of conveyor arrangements with arm means according to prior art.

Closed-loop conveyor arrangements have a conveyor path, along which the conveyor means is driven, typically in a constant speed. Items to be transported are in different ways attached to the conveyor means. In many applications it is desirable to control the angle of the item referred to the conveyor path and/or the distance between two consecutive items in a well reproducible manner at certain positions or path portions.

One often used basic principle of such control is to connect the items or carriers for items to the conveyor means by means of some type of positioning arrangement, e.g. an arm arrangement. By separating the carrier or item from the actual conveyor path by a certain distance, there is a possibility to modify angles of the carrier/item and/or distances between them. The positioning arrangements are typically pivotably attached to the conveyor means. An example of such a prior art arrangement is illustrated in numerals in order to increase the readability of the figure. Here, a chain 10 is provided with pivotable axes 13, to which one end of arms 14 are attached. The arms 14 are in the opposite end rigidly attached to a carrier 16. The arm 14 is in its middle part provided with a follower member 18. This follower member 18 is guided by a guiding slot 20, which extends substantially parallel to the path of chain 10. The chain 10 is moved in the direction of the arrow 12. By reducing the distance between the chain 10 path and the guiding slot 20, which is the case in the section 22, the arm 14, and thereby the carrier 16 is forced somewhat backwards, with reference to the direction of motion 12 and the position of the attachment point, i.e. the axis 13. The average distance between to consecutive carriers 16 within the section 22 is reduced as compared with the distance between consecutive axes 13. In section 24, the distance between the guiding slot 20 and the chain 10 is increased again, and the carriers 16 are turned back to their original angular positions. The average distance between consecutive carriers 16 within this section 24 is clearly larger than in section 22. In this manner, the inter-distance between transported items has been adjusted in prior art.

Figure 1B:
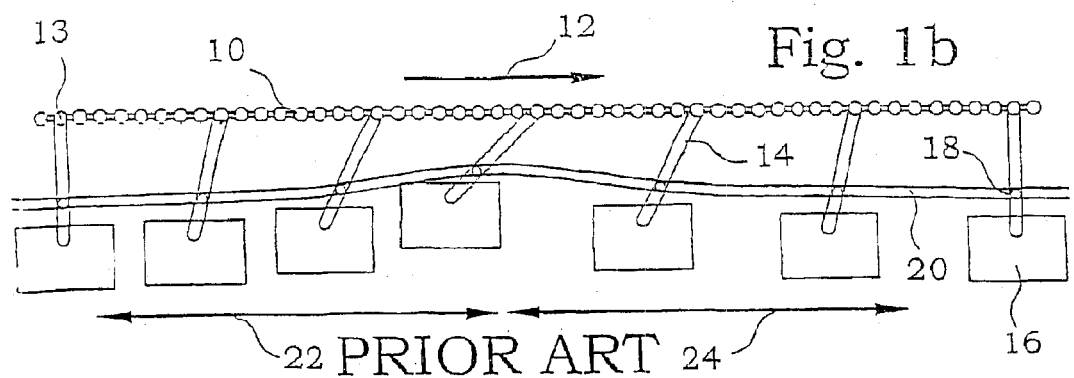

In FIG. 1a, one notices that the carrier 16 is turned when the inter-distance is changed. If this behaviour is of disadvantage, one has to provide for some additional positioning arrangement. In GB 2 067 968, this is achieved by the additional follower means on the second positioning arrangement. If the conveyor path is arranged substantially in the vertical direction, i.e. having vertical and horizontal portions, gravitational forces may be utilised for controlling the carrier angle. Such a system is illustrated in FIG. 1b. The attachment of the arms 14 to the carriers is here pivotable, and the gravitation keeps the carrier substantially horizontal during the entire travel. All other parts are identical to the arrangement in FIG. 1a and are not described again. The changing inter-distances between consecutive carriers are easily distinguished also here.

Figure 2:
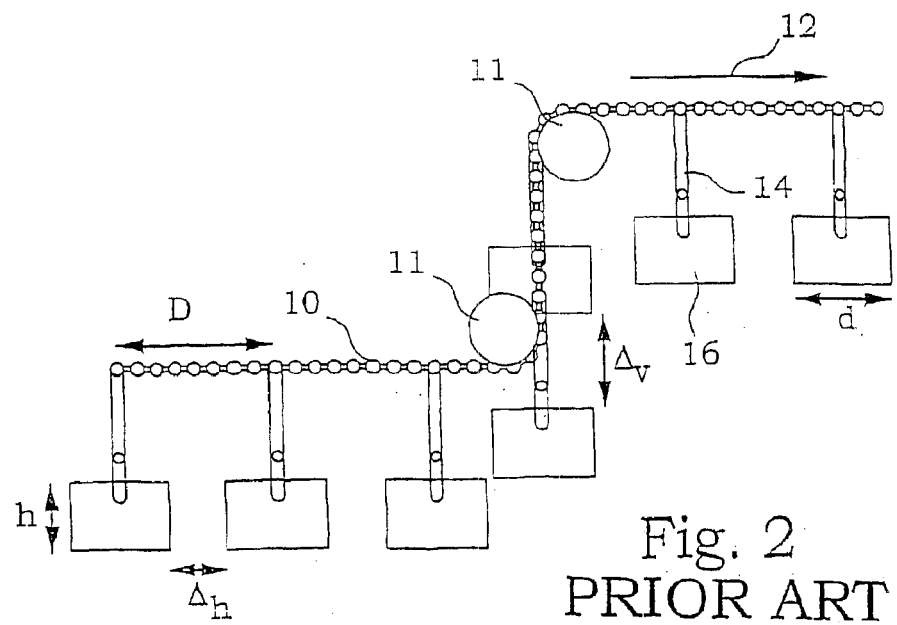
FIG. 2 is a sketch for explaining the need for inter-distances between conveyed objects.

In the following section, the reason for having item inter-distances is explained more in detail. In FIG. 2, a part of a conveyor arrangement in the vertical plane is illustrated. A chain 10 is arranged to follow a path by means of two gear wheels 11 along the direction of the arrow 12. Arms 14 are pivotably arranged at the chain 10 and also pivotably attached to carriers 16. The carriers 16 are thus positioned in their vertical direction by means of gravitational forces. The carriers 16 have a height h, a length in the motion direction of d, and the inter-distance between the items in the horizontal portions of the path is $\Delta h$. The inter-distance in the vertical portions is denoted by $\Delta v$. When an arm travelling along the horizontal portion reaches a gear wheel 11, the transportation direction changes. Instead of a horizontal motion, a vertical motion is given. Due to the finite size of the carriers 16, an item has to be lifted up a distance corresponding to its own height before a following carrier reaches the back edge of the carrier in front. Since the vertical and horizontal speeds are equal, determined by the speed of the chain 10, the minimum inter-distance Δh is equal to the height h of the carrier. Similarly, Δh has to be at least equal to the carrier length d.

Figure 3:
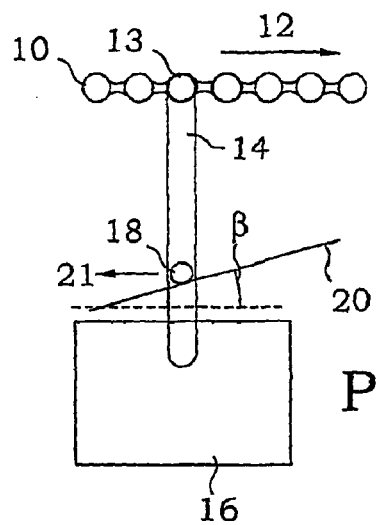
FIG. 3 is a principle sketch of the function of an arm member according to prior art.

The simplest form of arm arrangement with a follower member is presented in FIG. 3. Such an arrangement is available according to prior art. A chain 10 is driven in the direction of the arrow 12. The arm 14 is pivotably attached both to the chain 10, by an axis 13, and to the carrier 16, and the gravitational force maintains the direction of the carrier 16. During the normal transport, when no inter-distance adjustment is required, the carrier 16 is simply hanging down from the chain 10 in the arm 14. A follower member 18 may, however, be brought into contact with a guiding structure 20. The follower member 18 is thereby prohibited to continue in the same speed as the axis 13 between the chain 10 and the arm 14, and it is forced backwards relative to the position of this axis 13, as indicated by arrow 21. The follower member 18 is thus moving continuously to the right in the figure, but now with a reduced speed. The maximum stroke of this arm arrangement depends on the available angle interval and the length of the arm 14. One notices, however, that the arm 14 will not be able to force the carrier 16 in front of the attachment point 26 to the chain 10 with any simple means.

In order to get the follower means 18 to move in front of the axis 13, the angle of the arm 14, referring to the vertical direction, has to be larger than slope β of the guiding structure 20. Furthermore, passing this threshold angle, the mechanical behaviour of the follower means 18 may not be stable, i.e. the follower means 18 may then choose either to move in front of the axis 13 or behind. Construction tolerances may also influence the behaviour, and the arm 14 may simply be stuck in such situations. The angle interval is therefore normally restricted to backward movements, i.e. less than 90 degrees.

According to the present invention, in order to minimise the necessary space around the conveyor, a short arm length is selected. In order to achieve a large total stroke anyway, the arm is provided with a follower member arrangement giving possibilities for turning angle intervals of up to close to 180 degrees. The principles of the action of such arm arrangements are illustrated by the embodiments in the FIGS. 4a to 4d.

Figure 4A:
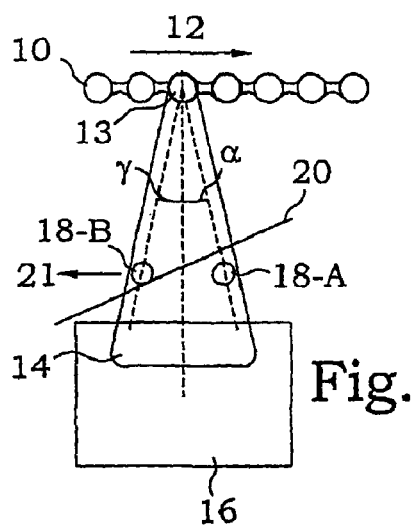
FIGS. 4a–d are principle sketches of different aspects of the function of an arm member according to the present invention.

In FIG. 4a, an arm member 14 is pivotably attached to a chain 10 by an axis 13. The chain is moved in the direction indicated by arrow 12. A carrier means 16 is attached to the lower part of the arm member 14 in a pivotable manner (not shown). The arm member 14 of the present embodiment is provided with a follower member arrangement comprising two follower members, a front follower member 18-A and a rear follower member 18-B. When none of the follower members 18-A and 18-B are in contact with any supporting surface, the carrier means 16 is hanging in a vertical direction due to gravitational forces. The connection line between the axis 13 and the front follower member 18-A then defines an angle α with the vertical direction. In the corresponding manner, the connection line between the axis 13 and the rear follower member 18-B defines an angle γ with the vertical direction. As indicated in FIG. 4a, the angles are defined to be positive if the vertical line passes in between the two follower members 18-A and 18-B.

In FIG. 4a, a situation is illustrated, where a guiding structure 20 just comes into contact with the rear follower member 18-B. The distance between the guiding structure 20 and the path of the chain 10 decreases in the motion direction 12. The arm 14 behaves substantially as prior art arms and the rear follower member 18-B forces the arm to turn backwards, with respect to the axis 13 and the driving direction 12 as indicated by the arrow 21. The speed of the carrier means 16 is reduced as compared with the speed of the axis 13.

Figure 4C:
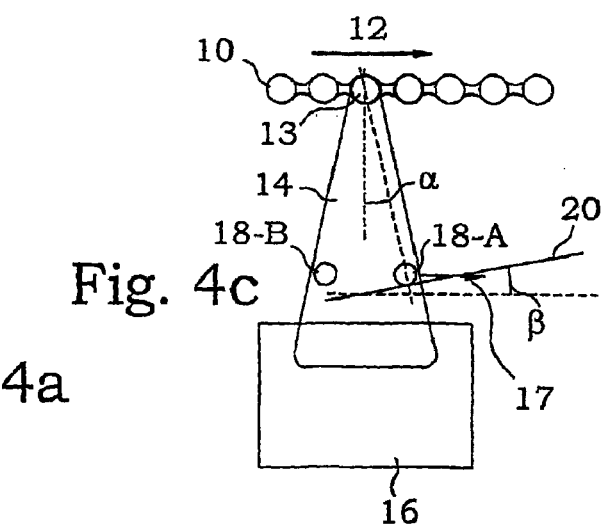
Figure 4B:
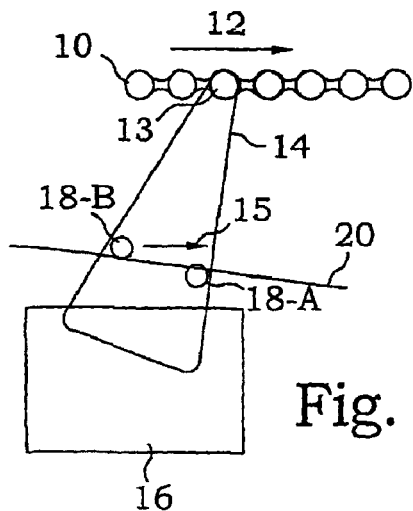

In FIG. 4b, the rear follower member 18-B has been used as in FIG. 4a to turn the arm 14 backwards. The guiding structure 20 is, however, in the illustrated portion now pointing somewhat downwards, i.e. the distance between the guiding structure 20 and the path of the chain 10 increases in the motion direction 12. The arm 14 is thereby gradually allowed to swing forwards, with respect to the axis 13 and the driving direction 12 as indicated by the arrow 15. The speed of the carrier means 16 is now higher than the speed of the axis 13.

In FIG. 4c, a situation is illustrated, where a guiding structure 20 instead comes into contact with the front follower member 18-A. The distance between the guiding structure 20 and the path of the chain 10 decreases in the motion direction 12. If the angle α of the front follower member 18-A is larger than the slope β of the guiding structure 20, the front follower member 18-A will be pushed in front of the axis 12. The arm 14 thereby turns forwards, with respect to the axis 13 and the driving direction 12 as indicated by the arrow 17. The speed of the carrier means 16 is during such a motion higher than the speed of the axis 13. Once the arm starts to turn forwards, the angel α increases, whereby the slope β of the guiding structure 20 also can be increased. However, the angles α and β should never be allowed to be essentially the same, since this may introduce mechanical jamming configurations.

Figure 4D:
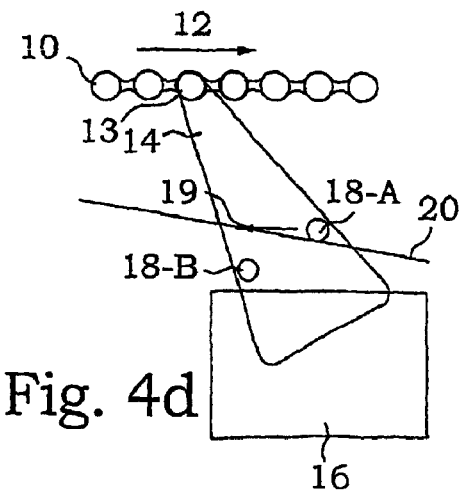

In FIG. 4d, the front follower member 18-A has been used as in FIG. 4b to turn the arm 14 forwards. The guiding structure 20 is, however, in the illustrated portion now pointing somewhat downwards, i.e. the distance between the guiding structure 20 and the path of the chain 10 increases in the motion direction 12. The arm 14 is thereby gradually allowed to swing backwards, with respect to the axis 13 and the driving direction 12 as indicated by the arrow 19. The speed of the carrier means 16 is now lower than the speed of the axis 13.

From the FIGS. 4a to 4d, anyone skilled in the art understands that almost any motion behaviour of the arm 14 may be achieved, by combining the four motion modes. Different speeds of the carrier means 16 are available although the chain 10 moves at a constant speed. Also different inter-distances between two consecutive carrier means 16 are possible to achieve. Since the available angle range, in which a stable mechanical guiding is provided, is large, a relatively large inter-distance adjustment is possible to perform with a relatively short arm member 14 length. In a preferred embodiment, the length of the arm 14 is of about the same magnitude as the height of the carrier means 16. Even more preferable, the length of the arm 14 is less than or substantially equal to the height of the carrier means 16.

The arm members according to the present invention can be formed in many ways. At least two follower members are provided at the same rigid arm structure. Furthermore, it is advantageously if a line connecting the pivotable attachment point of the conveying means and the middle of the attachment means of the carrier means goes between the follower members. In other words, the follower members are preferably positioned at each side of the connection line. With the definitions of FIG. 4a, this means that the angles α and γ both are positive. This angle has preferably value that is significant larger than zero, in order to allow for steeper slopes in situations as the one illustrated in FIG. 4c. However, a too large value will reduce the available tilting angle range.

In FIGS. 4a–e, the follower members are positioned at the same distance from the axis 13 and have the same diameter and protrusion length. The follower members may, however, depending on the actual application, also be positioned at different distance from the axis 13. Different distances simplify typically the application of different segments of the guiding surface to come into contact with the follower members. Furthermore, differences in the follower member size along the arm surface, i.e. the diameter have basically the same effect, and also the size perpendicular to the arm surface, i.e. the protrusion length may differ.

It is preferred, if the follower members are provided with freely rotating wheels, which are to come into contact with the guiding surface. This reduces the frictional forces against the guiding surface considerably.

The shape of the arm member can be varied almost infinitely. In FIGS. 4a–e, a triangular form is illustrated. Different types of crosses or double arm structures may also be used, depending on the intended application.

Arm arrangements according to the present invention are useful in many applications. In the following, an irradiation equipment comprising such a conveyor arrangement will be described somewhat more in detail. Some useful and preferred embodiments of the conveyor systems will at the same time be described. Particle and/or electromagnetic radiation is in many applications used for sterilising purposes or for material modifying purposes. Common for such irradiation equipment is that they typically allow for very small spaces for conveying means, and that the conveyor path is labyrinthed.

An irradiation equipment 1 is schematically illustrated in a partly exploded view, with certain parts completely removed in order to increase the visibility. The equipment comprises an upper irradiation head 30 and a lower irradiation head 32, between which an irradiation sector 34 is situated. The upper irradiation head 30 and its associated radiation shield 38 are lifted in the illustration in order to reveal the irradiation section more clearly. The irradiation heads are preferably designed according to the disclosure of the international patent application WO 99/00801, but other designs are also possible. Also designs with irradiation towards the irradiation sector from only one side are useful. Also the lower irradiation head 32 is surrounded with radiation shields 40, 42, 44, and further shields are removed to uncover the essential parts of the equipment. Support sections 52 support the entire equipment 1.

Figure 5:
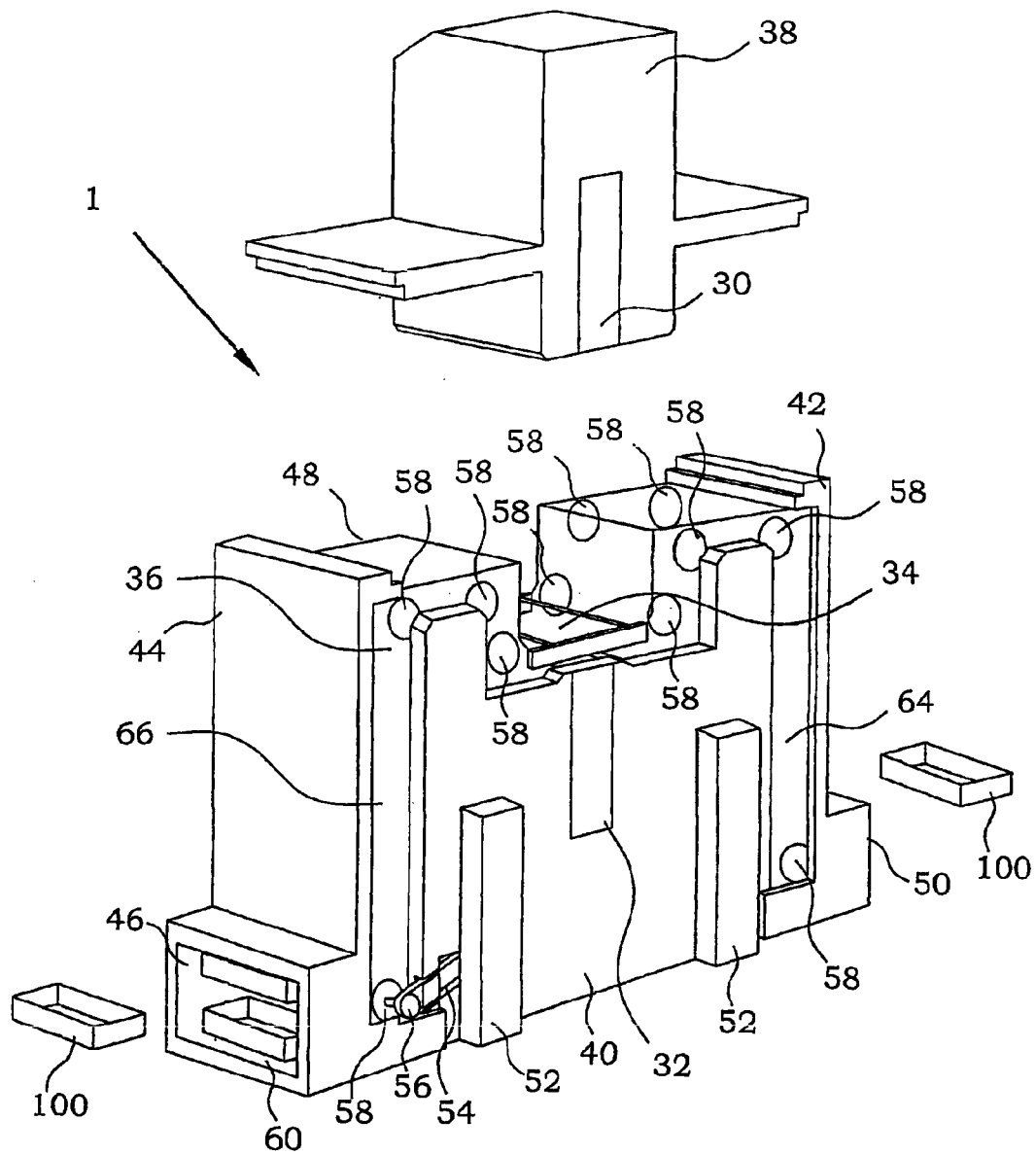
FIG. 5 is an illustration, partly exploded and with parts excluded, of an irradiation equipment according to the present invention.

A conveyor arrangement 36 is arranged in a labyrinth configuration of alternating vertical and horizontal portions. The labyrinth configuration is caused by radiation, restrictions. In operation, items within the irradiation sector 34 will be irradiated by electron radiation. The radiation is partly absorbed in the items and surrounding parts of the equipment, e.g. the conveyor arrangement and a part of this absorbed radiation will give rise to secondary radiation in the form of particle of electromagnetic radiation. Such secondary radiation is emitted in arbitrary directions, and a part of it is emitted along the conveyor. By introducing a number of sharp turns on the conveyor, surrounded by radiation shields, the secondary radiation will not be able to escape from the irradiation equipment until hitting the radiation shield a couple of times. In order to reduce the escaping radiation to allowed levels with the present embodiment, four turns on the conveyor path on each side of the irradiation sector 34 were necessary. In FIG. 5, the radiation has to go as far as to the exit port 46 in order to escape from the equipment 1.

The conveyor arrangement 36 of this irradiation equipment 1 comprises a conveyor channel 48, which encloses the conveyor arrangement 36 during the labyrinth portions of the path. The conveyor channel 48 is made in stainless steel. In and in the vicinity of the irradiation sector 34, the conveyor channel 48 is omitted in order to give the radiation full access to the items to be irradiated. The conveyor arrangement 36 has an entrance port 50 and an exit port 46, at which the conveyor arrangement 36 is interfaces with other conveyor systems or side equipment. The function of such devices are different from case to case and are of no particular interest for the present invention and will therefore not be described in detail. The only requirement for such side equipment is that they should be able to load and unload items to be irradiated.

A driving motor (not shown) drives a belt 54, which in turn drives a wheel 56 and therewith connected gear wheel 58 at the front side and a corresponding gear wheel at the backside (not shown). Each gear wheel 58 is arranged to drive the conveying means of the conveyor arrangement 36—a pair of chain, which for general visibility is not shown in the figure. The chains are further arranged around non-driven gear wheels 58 (only some are visible in the figure) to define a conveyor path. Each chain is provided with arm members, further described below, which are arranged to engage with opposite ends of carrier boxes 100, also described in detail below.

The carrier boxes 100 are provided from the entrance side equipment or entrance conveyor to the entrance port 50 and contains items to be irradiated. The arm member grip the carrier boxes 100 successively and carry them into the entrance labyrinth 64. The carrier boxes are, according to the previous discussion, conveyed with a certain inter-distance, in order to avoid collisions. When the carrier boxes 100 are leaving the entrance labyrinth 64 and enter into the irradiation sector 34, the arm members according to the present invention are guided to bring the carrier boxes 100 into contact or near contact with each other. This is described more in detail below. This close relation between the carrier boxes 100 is maintained through the entire irradiation sector 34, while the speed is somewhat reduced in comparison with the speed of the chain pair. When the carrier boxes 100 are entering into the exit labyrinth 66, the carrier boxes 100 are allowed to recover the original inter-distance in order to handle the bends of the labyrinth. The carrier boxes 100 exit through the exit port 46 and an exit side equipment takes care of the carrier boxes 100 and its irradiated content, whereby the arm members release their grips. The arm members are returned to the entrance port 50 through a return passage 60, which also is used to return emptied carrier boxes 100 to the entrance side.

Figure 6:
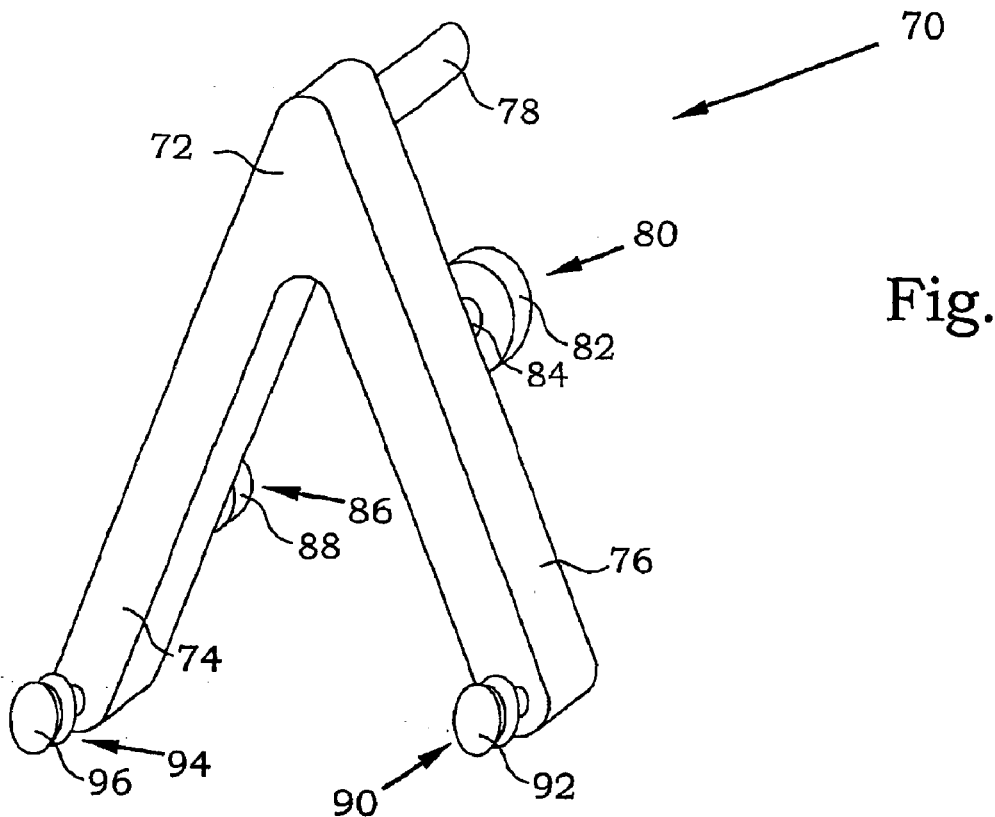
FIG. 6 shows an arm member used in the equipment shown in FIG. 5.

In FIG. 6, an illustration of a preferred embodiment of an arm member 70 according to the present invention is illustrated. A main body 72 mainly consists of two arms 74, 76 arranged in a "V" configuration. In the edge part of the main body, an axis 78 is provided, which fits with a rotational bearing into joints of the chain arrangement. The axis 78 and the chain provides a pivoting attachment means. The arm member 70 is provided with a front follower member 80, comprising a shaft 84 and a freely rotatable wheel 82.

The arm member 70 is according to the present invention also provided with a rear follower member 86, comprising a shaft (not shown) and a freely rotatable wheel 88. The wheel 82 has in this embodiment a larger radius than the wheel 88, and the shaft 84 is provided at a smaller distance from the axis 78, than the not shown shaft of the rear follower member 86.

Close to the free ends of the arms 74 and 76, respectively, carrier-supporting members 90 and 94, respectively, are provided. In this embodiment, each carrier supporting member 90, 94, comprises a freely rotatable grooved wheel 92, 96. The carrier supporting members are protruded in the opposite direction to the follower members 80, 86.

Figure 7A:
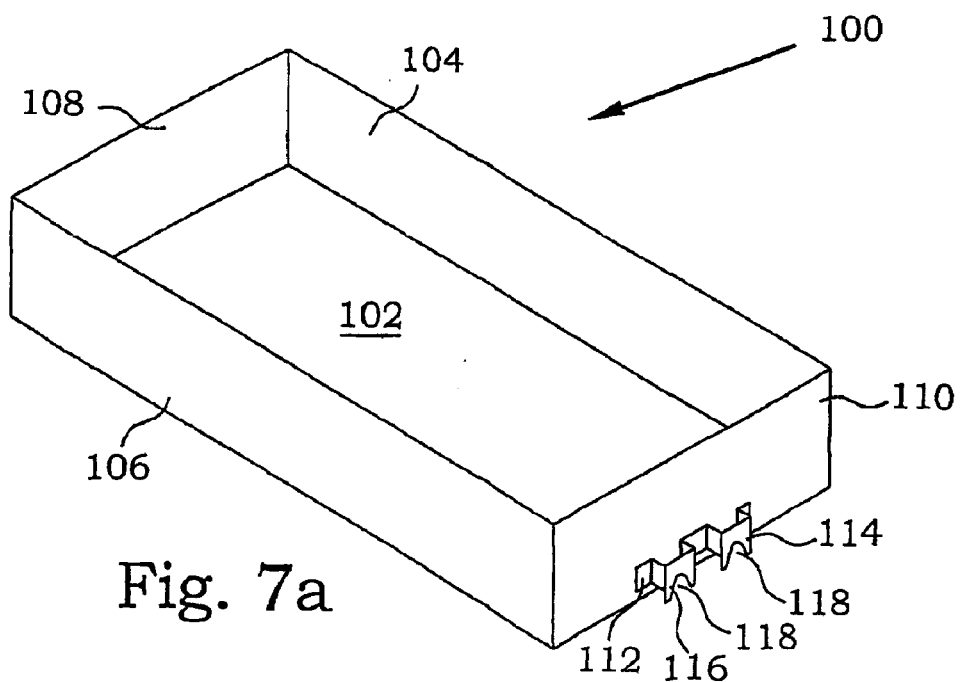
FIG. 7a shown a carrier box used in the equipment shown in FIG. 5.

FIG. 7a illustrates a carrier box 100, comprising a bottom 102, two long side walls 104, 106 and two short side walls 108, 110. On each of the short side walls 108, 110, a catching plate 112 is provided (only one is shown). The catching plate 112 has two protruding portions 114, 116, which are provided with a groove 118 open towards the bottom 102. The grooves are formed for interaction with the carrier supporting members 90, 94 of the arm member 70 (FIG. 6). When the carrier supporting members 90, 94 are brought from below up into the grooves 118, they will engage with the catching plates 112 and lift the carrier box 100.

Figure 7B:
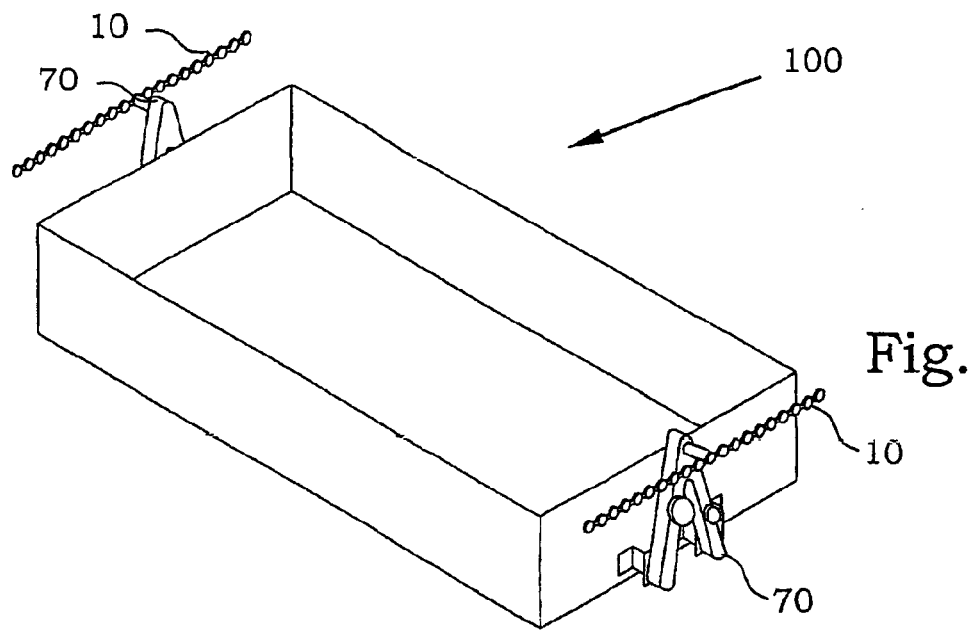

FIG. 7b illustrates a carrier box 100, lifted by two arm members 70. The arm members 70 are in turn pivotably attached to a chain at each side of the carrier box 100, indicated by a broken line.

The engagement of the two carrier supporting members 90, 94 and the grooves 118 gives the conveyor arrangement double attachment points between the carrier box 100 and the arm member 70. These double attachment points stabilise the box during the parts of the conveyor path where the carrier box 70 hangs freely in the arm members 100. The carrier box 100 will not be able to turn around due to any asymmetric loading of the carrier box 100. When the arms 74, 76 are forced to tilt in the vicinity of the irradiation section 34 (FIG. 5), one of the carrier supporting members 90, 94 is forced out from the corresponding groove 118 and only one attachment point remains. During this section of the conveyor path—the irradiation sector 34, an additional support for the carrier box 100 has to be provided, in this embodiment a series of rollers. However, when the arm members 70 are allowed to tilt back again, the released carrier-supporting member 90, 94 regains its grip into the groove.

Figure 8:
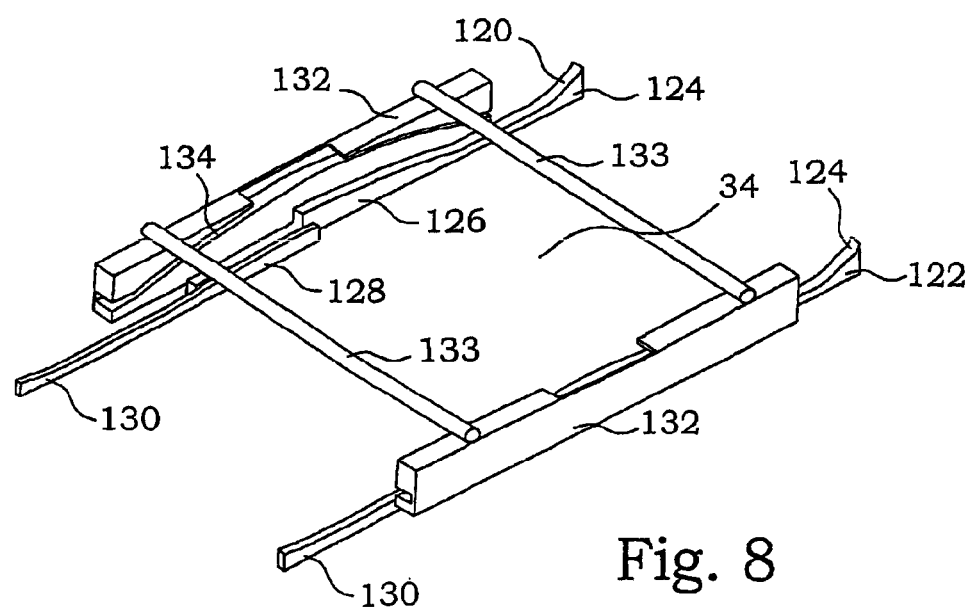
FIG. 8 illustrates guiding surfaces and chain guiding blocks used in the equipment shown in FIG. 5.

The irradiation sector 34 is the most important portion of the conveyor path. Here, the carrier boxes 100 are to be packed side-by-side and brought in a smooth manner through the radiation in order for the items carried in the boxes to be irradiated. This controlled motion is accomplished by providing a guiding surface for the double follower members 80, 86. Only one follower member is in contact with the guiding surface at the time, while the other is inactive. In FIG. 8, the arrangement for the guiding is illustrated. A pair of guiding surfaces 120, 122 is provided at the sides of the irradiation sector 34. Each guiding surface 120, 122 comprises four segments.

A first segment 124 is arranged in order to be in contact with the front follower member and force the arm member in the forward direction. The inter-distance between consecutive carrier boxes is reduced until they are conveyed side by side. During this first segment, the distance between the guiding surface and the chain path is reduced. At the same time, the rear carrier-supporting member 94 is forced out from the corresponding groove in the carrier box 100.

A second segment 126 is arranged in order to gradually let the arm members return to their original direction by gradually increasing the distance between the guiding surface 120, 122 and the chain path. This gradual increase is arranged so that the arrangement of the carrier boxes side by side is maintained. The mean speed of the carrier boxes is in the meantime somewhat lower than the speed of the chain. The rear carrier-supporting member 94 gradually retains its engagement with tie corresponding groove in the carrier box 100.

When the arm members are back in the original angle position, the third segment 128 begins. In this segment, the front follower member 80 looses its contact with the guiding surface 120, 122, and instead the rear follower member comes into contact with the guiding surface 120, 122. During this third segment, the distance between the guiding surface and the chain path is reduced gradually, which forces the arm member to swing backwards. This gradual reduced distance is arranged so that the arrangement of the carrier boxes side by side is maintained. The mean speed of the carrier boxes is in the meantime still somewhat lower than the speed of the chain. The front carrier-supporting member 94 now gradually looses its engagement with the corresponding groove in the carrier box 100.

A fourth segment 130 is finally arranged in order to restore the original relative positions of the carrier boxes. During this fourth segment, the distance between the guiding surface and the chain path is increased, which allows the arm to swing forwards, until the carrier boxes hangs freely. The front carrier-supporting member 94 retains its engagement with the corresponding groove in the carrier box 100. The inter-distance between consecutive carrier boxes is increased until the original inter-distance is reached. The carrier boxes are ready to enter into the labyrinth again.

Since the tilting of the arm members also influences the vertical distance between the chain path and the carrier boxes, the chain path has to be adjusted, in order to keep the path of the carrier boxes linear. The chains are therefore guided through a guiding groove 134 in a guiding block 132 at each side of the irradiation section 34. The guiding groove 134 forces the chains to follow a bent path within the irradiation section 34, which allows for a linear carrier box motion. The guiding surfaces 120, 122 are of course adapted to this bent chain path. Therefore, the guiding surfaces are somewhat bent upwards, despite the fact that the distance to the chain path is largest in the centre part.

Figure 9:
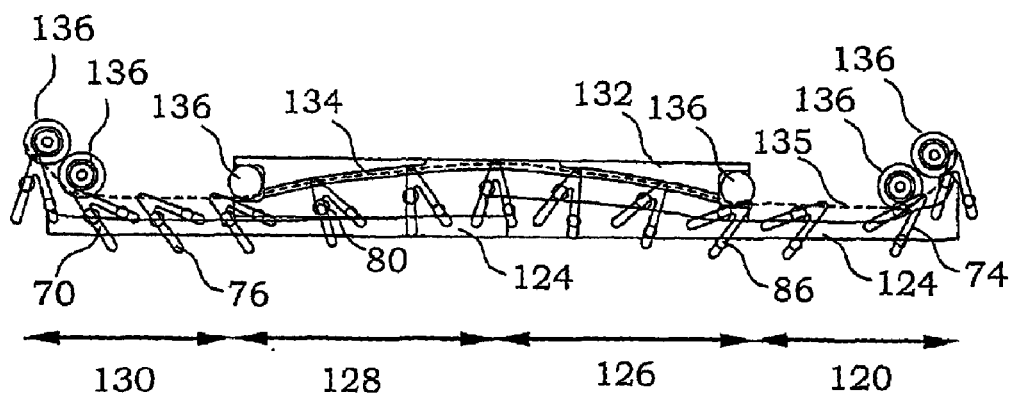
FIG. 9 illustrates the motion of an arm member along the devices in FIG. 8.

In FIG. 9, a schematic illustration shows how the entire movement of the arm members is performed. Here the forward tilting in the first segment 124 is seen, followed by the straighten-up in the second segment 126. In the third segment 128, the arm member 70 is tilted in the opposite way, and finally in the fourth segment 130 the arm member 70 is again allowed to be placed vertically.

Figure 10:
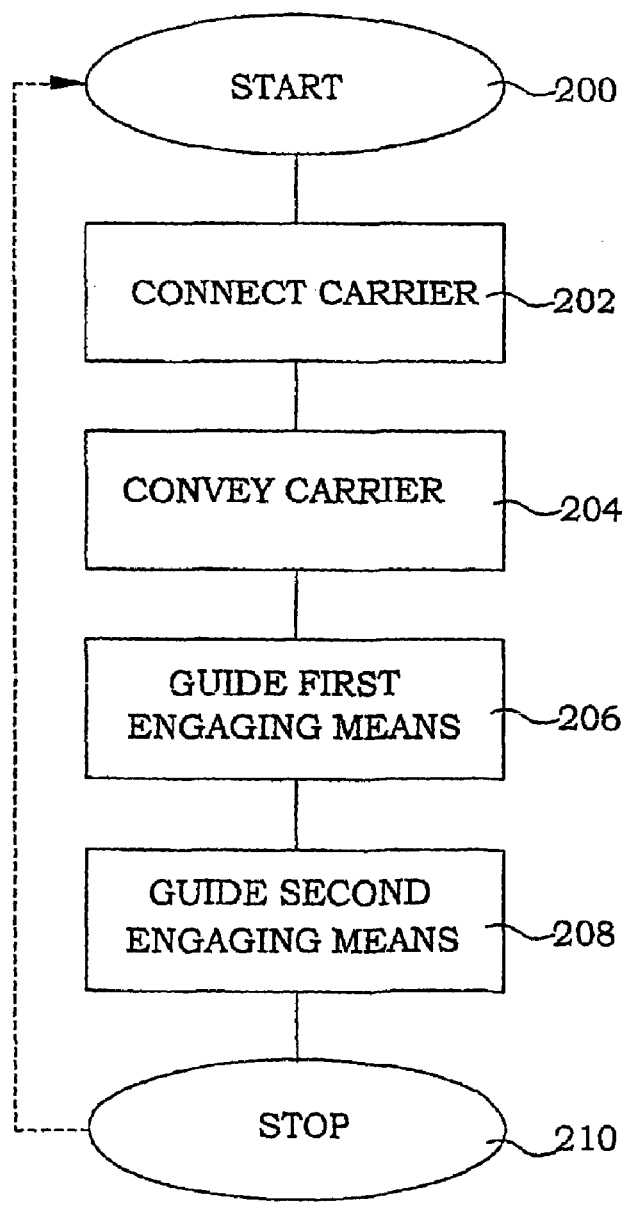
FIG. 10 is a flow diagram illustrating the basic steps of a conveying method according to the present invention.

In FIG. 10, a flow diagram of a method according to the present invention is shown. The process starts in step 200. In step 202, a carrier means is connected to a conveying means by one or several arm members. In step 204, the carrier means is conveyed by moving the conveying means along a closed loop path. During this motion, a first engaging means is guided along a first part of a predetermined path, according to step 206. Furthermore, a second engaging means is guided along a second part of the predetermined path, according to step 208. The process ends in step 210. This process is in reality a continuous process, which is indicated by the broken arrow from the stop step 210 to the start step 200. The steps 204 and 206 are performed simultaneously, and the steps 204 and 208 are also performed simultaneously. However, steps 204 and 206 are preferably not performed at the same time.

It will be understood by those skilled in the art that various modifications and changes may be made to the present invention without departure from the scope thereof, which is defined by the appended claims. The conveyor means may comprise chains, wires, belts, bands or any other flexible means that can be driven around a closed loop. The carrier means does not have to be designed as a rigid unit. If the items to be transported are suitable, the carrier means may be formed simply as attachment means directly fixed to the items to be transported. Any type of means for carrying may be used, depending on the actual application.

What is claimed is:

1. Conveyor arrangement comprising:
   conveying means (10) defining a closed loop path;
   driving means (54, 56) arranged to drive the conveying means around the closed loop path;
   a plurality of arm means (14; 70), pivotably connected to the conveying means (10) around a substantially horizontal axis (13; 78) for travelling along the closed loop path, each arm means comprising a follower member arrangement (18-A, 18-B; 80, 86);
   guiding means (20; 124), arranged in the vicinity of the closed loop path, the follower member arrangement (18-A, 18-B; 80, 86) of the arm means (14; 70) being forced in contact with the guiding means (20; 124) during at least a part of the travel along the closed loop path; and
   carrier means (16; 100), being pivotably connectable to said arm means (14; 70),
   characterised in that
   the follower member arrangement comprises a first engaging means (18-A; 80) and a second engaging means (18-B; 86) directly provided at the same rigid arm means, whereby the first engaging means (18-A; 80) is forced in contact with a first section (120, 122, 126) of the guiding means (124) during a first part of the travel along the closed loop path, and the second engaging means (18-B; 86) is forced in contact with a second section (128, 130) of the guiding means (124) during a second part of the travel along the closed loop path.

2. Conveyor arrangement according to claim 1, characterised in that the first and second part of the travel have no common parts, whereby only at the most one of the engaging means (18-A, 80, 18-B, 86) is forced in contact with the guiding means (20; 124) at a time.

3. Conveyor arrangement according to claim 1, characterised in that the first (18-A, 80) and second (18-B, 86) engaging means are provided at opposite sides of a connection line between an attachment axis (13; 78) of the arm means (14; 70) and the centre of the connection (112) of the carrier means (16; 100).

4. Conveyor arrangement according to claim 1, characterised in that the first (18-A, 80) and second (18-B, 86) engaging means are protrusions provided with rollers (82, 88).

5. Conveyor arrangement according to claim 4, characterised in that the protruding distances of the protrusions at one and the same arm means (14; 70) are different.

6. Conveyor arrangement according to claim 1, characterised in that the first (18-A, 80) and second (18-B, 86) engaging means are forced against the guiding means (20; 124) by gravitational forces.

7. Conveyor arrangement according to claim 1, characterised in that the engaging means (18-A, 80, 18-B, 86) are arranged at different distances from the axis (13; 78) between the conveying means (10) and the arm means (14; 70).

8. Conveyor arrangement according to claim 1, characterised in that the arm means (70) comprises at least two carrier supporting members (90, 94), and the carrier means (100) have catching means (118) for releasable engagement with each one of the carrier supporting members (90, 94).

9. Conveyor arrangement according to claim 8, characterised in that the only one carrier supporting member is in engagement with the catching means (118) during the first and second part of the travel along the closed loop path.

10. Conveyor arrangement according to claim 1, characterised in that the conveying means (10) comprises a chain.

11. Conveyor arrangement according to claim 1, characterised in that the arm means (14; 70) are connected to the conveying means (10) at regular distances.

12. Conveyor arrangement according to claim 1, characterised in that the guiding means (20; 124) is present only in a part of the closed loop path, whereby the arm means (14; 70) are freely pivotable under the influence of gravitational forces where the guiding means is not present.

13. Conveyor arrangement according to claim 1, characterised in that the distance between the axis (13; 78) and the connection (90, 94, 118) between the arm means (14; 70) and the carrier means (16; 100) is of the same magnitude as the height of the carrier means (16; 100).

14. Conveyor arrangement according to claim 1, characterised in that the guiding means (20; 124) having a section (120) where the first engaging means (18-A; 80), as defined by the arm travel direction (12), is forced in contact, said section being arranged with a decreasing distance between the closed loop path and the section surface in said forward direction, whereby a carrier (16; 100) is forced forwards with respect of the axis (13; 78) between the driving means (10) and the arm means (14; 70).

15. Conveyor arrangement according to claim 1, characterised in that the guiding means (20; 124) having a section (126) where the first engaging means (18-A; 80), as defined by the arm travel direction (12), is forced in contact, said section being arranged with an increasing distance between the closed loop path and the section surface in said forward direction, whereby a carrier (16; 100) is permitted to move backwards with respect of the axis (13; 78) between the driving means (10) and the arm means (14; 70).

16. Conveyor arrangement according to claim 1, characterised in that the guiding means (20; 124) having a section (128) where the second engaging means (18-B; 86), as defined by the arm travel direction (12), is forced in contact, said section being arranged with a decreasing distance between the closed loop path and the section surface in the forward direction, whereby a carrier (16; 100) is forced backwards with respect of the axis (13; 78) between the driving means (10) and the arm means (14; 70).

17. Conveyor arrangement according to claim 1, characterised in that the guiding means (20; 124) having a section (130) where the second engaging means (18-B; 86), as defined by the arm travel direction (12), is forced in contact, said section being arranged with an increasing distance between the closed loop path and the section surface in the forward direction, whereby a carrier (16; 100) is permitted to move forwards with respect of the axis (13; 78) between the driving means (10) and the arm means (14; 70).

18. Conveying method, comprising the steps of:
   connecting a carrier means (16; 100) to a conveyor means (10) by an arm member (14; 70); and
   conveying a conveying means (10) along a closed loop path;
   guiding a follower member arrangement (18-A, 18-B; 80, 86) of the arm member (14; 70) along a predetermined path substantially along at least a part of the closed loop path, for adjusting the position of the carrier means (16; 100), characterised in that said guiding step in turn comprises the steps of:

guiding a first engaging means (18-A; 80) of the follower member arrangement along a first part of the predetermined path; and guiding a second engaging means (18-B; 86) of the follower member arrangement along a second part of the predetermined path, said first engaging means and said second engaging means being directly provided at the same rigid arm means.

19. Conveying method according to claim 18, characterised in that the first and second parts of the predetermined path have no common parts, whereby only at the most one of the engaging means is guided at a time.

20. Conveying method according to claim 18, characterised in that the guiding is performed by means of gravitational forces.

21. Conveying method according to claim 18, characterised in that the guiding is performed during a part of the closed loop path.

22. Conveying method according to claim 18, characterised in that said guiding step comprises the step of guiding the first engaging means (18-A, 80), as defined by the arm travel direction (12), in front of the connection point between the arm member (14; 70) and the conveying means (10).

23. Conveying method according to claim 18, characterised in that said guiding step comprises the step of guiding the second engaging means (18-B; 86), as defined by the arm travel direction (12), behind the connection point between the arm member (14; 70) and the conveying means (10).

24. Conveying method according to claim 22, characterised in that said guiding step comprises the step of guiding the first engaging means (18-A; 80) or the second engaging means (18-B; 86), forwards in relation to the connection point between the arm member (14; 70) and the conveying means (10), thereby giving the carrier means (16; 100) a speed which exceeds the speed of the conveying means (10).

25. Conveying method according to claim 22, characterised in that said guiding step comprises the step of guiding the first engaging means (18-A; 80) or the second engaging means (18-B; 86), backwards in relation to the connection point between the arm member (14; 70) and the conveying means (10), thereby giving the carrier means (16; 100) a speed which is less than the speed of the conveying means (10).

26. Conveyor arrangement comprising:

conveying means (10) defining a closed loop;

driving means (54, 56) arranged to drive the conveying means around the closed loop path;

a plurality of arm means (14; 70) with a horizontal pivot member (13, 78) pivotably supporting the arm means to the conveying means (10) around a substantially horizontal axis (13; 78) for travelling along the closed loop path, each arm means comprising two arm portions (74, 76) diverging from the pivot, each arm portion mounting one of first and second follower member engaging parts (18-A, 18-B; 80, 86), a distance between the first and second follower member engaging parts being constant;

guiding means (20; 124), arranged adjacent the closed loop path, the follower member engaging parts (18-A, 18-B; 80, 86) being forced in contact with the guiding means (20; 124) during at least a part of the travel along the closed loop path; and carrier means (16; 100), being pivotably connectable to said arm means (14; 70), wherein the first following member engaging part (18-A; 80) is forced in contact with a first section (120, 122, 126) of the guiding means (124) during a first part of the travel along the closed loop path, and the second following member engaging part (18-B; 86) is forced in contact with a second section (128, 130) of the guiding means (124) during a second part of the travel along the closed loop path.

27. The conveyor arrangement of claim 26, wherein each of the first and second following member engaging parts comprise a rotatable wheel.

\* \* \* \* \*